United States Patent
Sun et al.

(10) Patent No.: US 7,660,882 B2
(45) Date of Patent: Feb. 9, 2010

(54) DEPLOYING NETWORK ELEMENT MANAGEMENT SYSTEM PROVISIONING SERVICES

(75) Inventors: Jiong Sun, Fremont, CA (US); Niraj Gopal, San Jose, CA (US); Satyanarayana Raju, Union City, CA (US); Sai V. Ramamoorthy, Sunnyvale, CA (US); Prasad Yerneni, Fremont, CA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1266 days.

(21) Appl. No.: 10/866,067

(22) Filed: Jun. 10, 2004

(65) Prior Publication Data

US 2006/0080424 A1    Apr. 13, 2006

(51) Int. Cl.
*G06F 13/00* (2006.01)
(52) U.S. Cl. .................................................. 709/223
(58) Field of Classification Search ................. 709/220, 709/224
See application file for complete search history.

(56) References Cited

U.S. PATENT DOCUMENTS

| | | | |
|---|---|---|---|
| 5,359,593 A | 10/1994 | Derby et al. |
| 5,594,792 A | 1/1997 | Chouraki et al. |
| 5,928,331 A | 7/1999 | Bushmitch |
| 5,968,176 A | 10/1999 | Nessett et al. |
| 5,970,064 A | 10/1999 | Clark et al. |
| 6,009,081 A | 12/1999 | Wheeler et al. |
| 6,021,263 A | 2/2000 | Kujoory et al. |
| 6,021,439 A | 2/2000 | Turek et al. |
| 6,028,842 A | 2/2000 | Chapman et al. |
| 6,046,980 A | 4/2000 | Packer |
| 6,047,322 A | 4/2000 | Vaid et al. |
| 6,061,725 A | 5/2000 | Schwaller et al. |
| 6,104,700 A | 8/2000 | Haddock et al. |
| 6,118,760 A | 9/2000 | Zaumen et al. |
| 6,134,603 A | 10/2000 | Jones et al. |
| 6,154,776 A | 11/2000 | Martin |

(Continued)

OTHER PUBLICATIONS

S. Blake, et al., "An Architecture for Differentiated Services," Dec. 1998, Network Working Group, Request for Comments: 2475, pp. 1-36.

(Continued)

*Primary Examiner*—Robert B Harrell
(74) *Attorney, Agent, or Firm*—Hickman Palermo Truong & Becker LLP

(57) ABSTRACT

A method and apparatus for deploying EMS provisioning services is provided. A communication to administer a particular service on a network element is transmitted from an EMS client to an EMS server. The communication contains service data that describes a particular service to be administered on the network element. The EMS server constructs an instance of a generic record that stores the service data. The EMS server selects a service module to process the instance based on which service is associated with the service data stored in the instance. The instance is processed to produce result data that describes the result of processing the service data at the network element. The EMS server stores the result data in a persistent store. This generic framework enables communications between EMS clients and the EMS server involving different services to be processed similarly. New services are added without modification to the generic framework.

76 Claims, 6 Drawing Sheets

U.S. PATENT DOCUMENTS

| | | | |
|---|---|---|---|
| 6,154,878 | A | 11/2000 | Saboff |
| 6,167,445 | A | 12/2000 | Gai et al. |
| 6,169,748 | B1 | 1/2001 | Barbas et al. |
| 6,170,009 | B1 | 1/2001 | Mandal et al. |
| 6,212,184 | B1 | 4/2001 | Venkatachary et al. |
| 6,286,052 | B1 | 9/2001 | McCloghrie et al. |
| 6,301,253 | B1 | 10/2001 | Ichikawa |
| 6,301,613 | B1 | 10/2001 | Ahlstrom et al. |
| 6,324,184 | B1 | 11/2001 | Hou et al. |
| 6,327,618 | B1 | 12/2001 | Ahlstrom et al. |
| 6,363,429 | B1 | 3/2002 | Ketcham |
| 6,393,473 | B1 | 5/2002 | Chu |
| 6,401,240 | B1 | 6/2002 | Summers |
| 6,424,659 | B2 | 7/2002 | Viswanadham et al. |
| 6,430,154 | B1 | 8/2002 | Hunt et al. |
| 6,442,151 | B1 | 8/2002 | H'mimy et al. |
| 6,463,470 | B1 | 10/2002 | Mohaban et al. |
| 6,466,984 | B1 | 10/2002 | Naveh et al. |
| 6,473,793 | B1 | 10/2002 | Dillon et al. |
| 6,483,805 | B1 | 11/2002 | Davies et al. |
| 6,484,261 | B1 | 11/2002 | Wiegel |
| 6,490,564 | B1 | 12/2002 | Dodrill et al. |
| 6,539,425 | B1 | 3/2003 | Stevens et al. |
| 6,570,875 | B1 | 5/2003 | Hegde |
| 6,577,644 | B1 | 6/2003 | Chuah et al. |
| 6,584,508 | B1 | 6/2003 | Epstein et al. |
| 6,594,268 | B1 | 7/2003 | Aukia et al. |
| 6,601,082 | B1 | 7/2003 | Durham et al. |
| 6,601,110 | B2 | 7/2003 | Marsland |
| 6,611,863 | B1 | 8/2003 | Banginwar |
| 6,611,864 | B2 | 8/2003 | Putzolu et al. |
| 6,621,793 | B2 | 9/2003 | Widegren et al. |
| 6,622,170 | B1 | 9/2003 | Harrison et al. |
| 6,625,657 | B1 | 9/2003 | Bullard |
| 6,651,191 | B1 | 11/2003 | Vacante et al. |
| 6,671,724 | B1 | 12/2003 | Pandya et al. |
| 6,684,244 | B1 | 1/2004 | Goldman et al. |
| 6,718,379 | B1 | 4/2004 | Krishna et al. |
| 6,718,380 | B1 | 4/2004 | Mohaban et al. |
| 6,760,761 | B1 | 7/2004 | Sciacca |
| 6,826,597 | B1 | 11/2004 | Lonnroth et al. |
| 6,839,766 | B1 | 1/2005 | Parnafes et al. |
| 6,952,703 | B1 | 10/2005 | Kathail et al. |
| 6,959,332 | B1 | 10/2005 | Zavalkovsky et al. |
| 7,054,901 | B2 | 5/2006 | Shafer |
| 7,096,256 | B1 | 8/2006 | Shafer |
| 7,111,206 | B1 | 9/2006 | Shafer et al. |
| 7,114,008 | B2 | 9/2006 | Jungck et al. |
| 7,146,414 | B1 | 12/2006 | Sievert et al. |
| 7,233,975 | B1 | 6/2007 | Gerraty et al. |
| 7,305,658 | B1 | 12/2007 | Hamilton et al. |
| 7,363,351 | B1 | 4/2008 | Shafer |
| 7,506,337 | B2 | 3/2009 | Iyer |
| 2002/0016814 | A1 | 2/2002 | Convent et al. |
| 2002/0019874 | A1 | 2/2002 | Borr |
| 2002/0065907 | A1 | 5/2002 | Cloonan et al. |
| 2002/0174207 | A1 | 11/2002 | Battou |
| 2003/0051008 | A1 | 3/2003 | Gorthy et al. |
| 2003/0101240 | A1 | 5/2003 | Courtney |
| 2003/0120678 | A1 | 6/2003 | Hill et al. |
| 2003/0229665 | A1 | 12/2003 | Ryman |
| 2004/0139179 | A1 | 7/2004 | Beyda |
| 2005/0033805 | A1 | 2/2005 | Fujiyama et al. |
| 2005/0108387 | A1* | 5/2005 | Li et al. ............... 709/224 |
| 2005/0204186 | A1 | 9/2005 | Rothman et al. |
| 2005/0246687 | A1 | 11/2005 | Scott |
| 2006/0031427 | A1 | 2/2006 | Jain et al. |

OTHER PUBLICATIONS

D. Durham, et al., "The COPS (Common Open Policy Service) Protocol," Jan. 2000, Network Working Group, Request for Comments: 2748, pp. 1-38.

S. Herzog, et al., "COPS usage for RSVP," Jan. 2000, Network Working Group, Request for Comments: 2749, pp. 1-17.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.(reference found on CD ROM).

International Searching Authority, "Notification of Transmittal of the International Search Report and the Written Opinion of the International Searching Authority, or the Declaration," PCT/US05/20057, dated Dec. 18, 2006, 6 pages.

Current Claims, PCT/US05/20057, 18 pages.

* cited by examiner

DEPLOYING NETWORK ELEMENT MANAGEMENT SYSTEM PROVISIONING SERVICES

RELATED APPLICATIONS

This application is related to co-pending U.S. patent application Ser. No. 10/866,338, filed Jun. 10, 2004, invented by Mark Freskos et al, entitled "Transport-Independent Pluggable Operation Type Handler Framework For Servicing XML Management Requests," the entire disclosure of which is hereby incorporated by reference as if fully set forth herein.

This application is also related to co-pending U.S. patent application Ser. No. 10/866,647, filed Jun. 10, 2004, invented by Mark Freskos et al, entitled "Two-Stage Network Device Configuration Process," the entire disclosure of which is hereby incorporated by reference as if fully set forth herein.

This application is also related to co-pending U.S. patent application Ser. No. 10/866,528, filed Jun. 10, 2004, invented by Kapil Jain et al, entitled "Configuration Commit Database Approach And Session Locking Approach In A Two-Stage Network Device Configuration Process," which is a continuation of co-pending U.S. patent application Ser. No. 10/866,647, the entire disclosure of which is hereby incorporated by reference as if fully set forth herein.

This application is also related to co-pending application U.S. patent application Ser. No. 10/866,169, filed Jun. 10, 2004, invented by Mark Freskos et al, entitled "Protocol For Efficient Exchange Of XML Documents With A Network Device," the entire disclosure of which is hereby incorporated by reference as if fully set forth herein.

FIELD OF THE INVENTION

The present invention relates to implementing an element management system (EMS) framework for provisioning one or more services between an EMS server and one or more EMS clients.

BACKGROUND

Using a network element management system (EMS) server, an EMS client may provision a service on a network element, such as a router. The EMS server is a server that is responsible for administering a service on a network element. The EMS client, which is operationally connected to the EMS server, allows an administrator to manage and configure the service being provisioned by the EMS server on the network element. For instance, if an administrator wishes to deploy a particular service, such as Voice Over IP (VoIP), on a particular router, the administrator may use an EMS client to communicate with an EMS server. After configuring the service using the EMS client, the administrator may deploy the service on the particular router by sending instructions from the EMS client to the EMS server to cause the EMS server to provision the service as configured on the particular router.

A significant amount of customized development is required for an EMS server to support the provisioning of a new service. For example, an interface between the EMS client and the EMS server for the new service must be defined. Also, software controlling how the EMS server persistently stores and retrieves data relating to the new service must be created and implemented on the EMS server. The EMS server also needs to be modified to support the conversion of data associated with the new service. Additionally, the EMS server must be configured to facilitate the communication of data related to the new service to the network elements.

The large amount of customized development required for an EMS server to support a new service is disadvantageous for a variety of reasons. First, as each new service requires a significant portion of software to be created from scratch, there is a real possibility of introducing one or more bugs into the customized software. Second, the great degree of customization increases the amount of time and cost of development. Finally, the customized interfaces created for each provisioned service in the EMS create a large number of interfaces between the EMS client and the EMS server. The large number of interfaces makes the user experience more complex as well as increases the amount of interfaces that must be maintained and supported by IT administrators. Based on the foregoing, there is a need in the art to support the provisioning of a new service by an EMS server without incurring the disadvantages of the above-described approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Description of embodiments is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments described herein. It will be apparent, however, that embodiments may be practiced without these specific details. In other instances, well-known structures and devices are shown in block diagram form in order to avoid unnecessarily obscuring the descriptions of the various embodiments described herein.

Functional Overview

A generic framework for an EMS server enables communications exchanged between EMS clients and the EMS server to be processed similarly by the EMS server using the same generic framework, even if those communications involve different services. New services can be added to a list of services supported by the EMS server without any modification to the generic framework of the EMS server.

In an embodiment, a communication to administer a particular service on a network element is transmitted from an EMS client to an EMS server. The communication contains service data that describes a particular service to be administered on the network element.

After receiving the communication, the EMS server constructs an instance of a generic record that stores the service data that was contained in the communication. By storing service data in an instance of a generic record, all services that are supported by the EMS server may be processed using the same generic components.

The EMS server then selects a service module to process the instance of the generic record based on which service is associated with the service data stored in the instance. The selected service module that the EMS selects to process the instance is configured to process instances of the generic record storing service data associated with the particular service being administered. For example, if the service data stored in the instance of the generic record is directed to Voice over IP service, then the selected service module is a module that is configured to provision the Voice over IP service.

The selected service module provisions the service on the network element. The result of provisioning the service on the network device is stored in result data that describes the result of processing the service data at the network element. The EMS server then stores the result data in a persistent store, such as a database.

Architecture Overview

Figure 1:
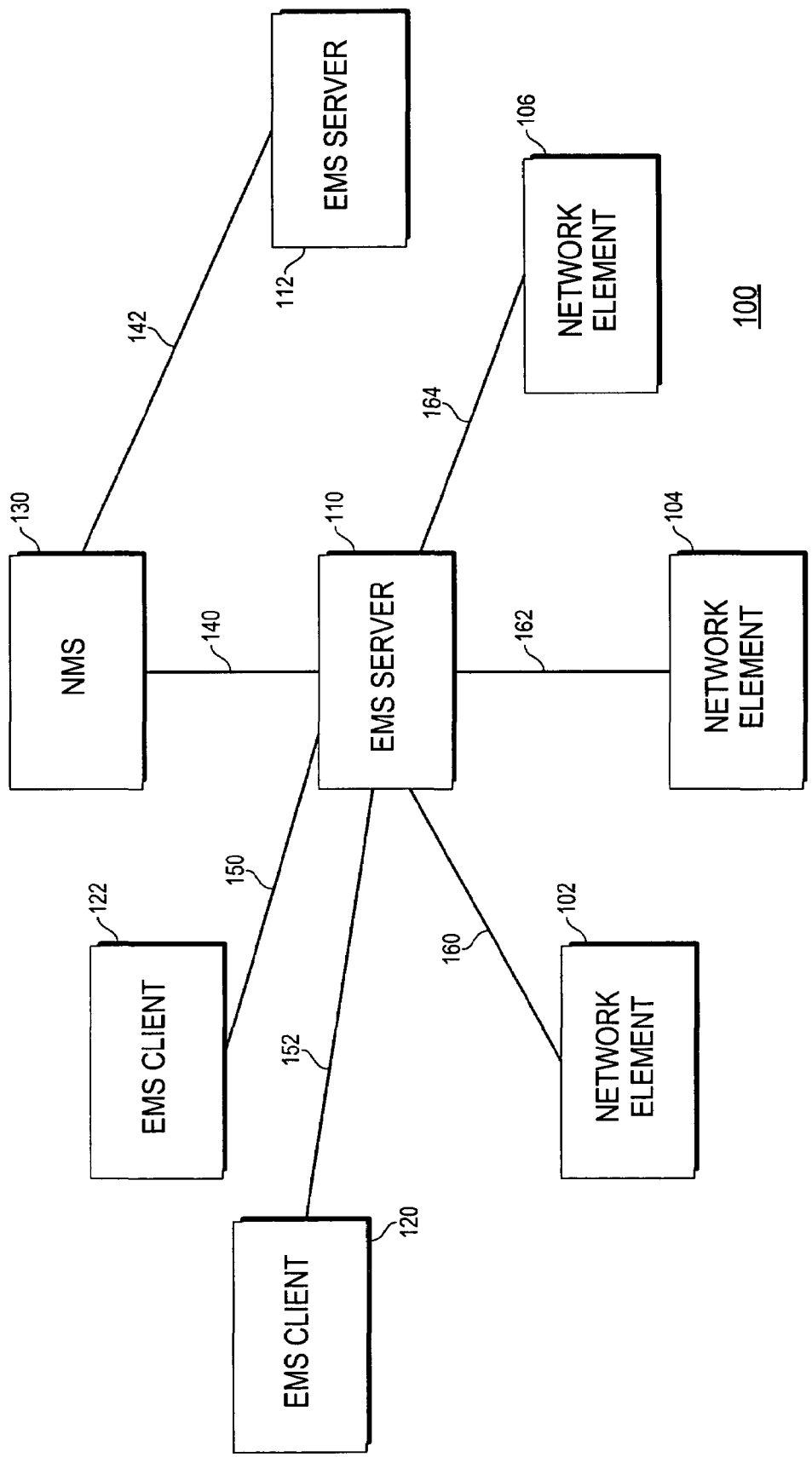
FIG. 1 is a block diagram illustrating the architecture of a system in accordance with an embodiment.

FIG. 1 is a block diagram illustrating the architecture of a system 100 in accordance with an embodiment. System 100 includes one or more network elements, one or more EMS servers, one or more EMS clients, one or more network management stations (NMS), and one or more communications links.

A network element, such as network elements 102, 104, and 106 as shown in FIG. 1, refers to any hardware component that is capable of being the subject of a service that is being provisioned by the EMS server. Non-limiting, illustrative examples of a network element include a router, a firewall, and a server. While FIG. 1 illustrates an embodiment comprising three network elements, embodiments of the invention may comprise one or more network elements.

An EMS Server, such as EMS server 110 and 112 as shown in FIG. 1, refers to any functional component that is capable of provisioning a service to one or more network elements. While FIG. 1 depicts a system comprising two EMS servers; embodiments of the invention may comprise one or more EMS servers. An EMS server according to an embodiment may provision one or more services to one or more network elements, regardless of what type each network element is or the type of service being provisioned. In other words, an EMS server in an embodiment may provision any service that the EMS server supports to any network element, even if the EMS server is provisioning the same service to multiple network elements having a different manufacturer type or model type.

Figure 3:
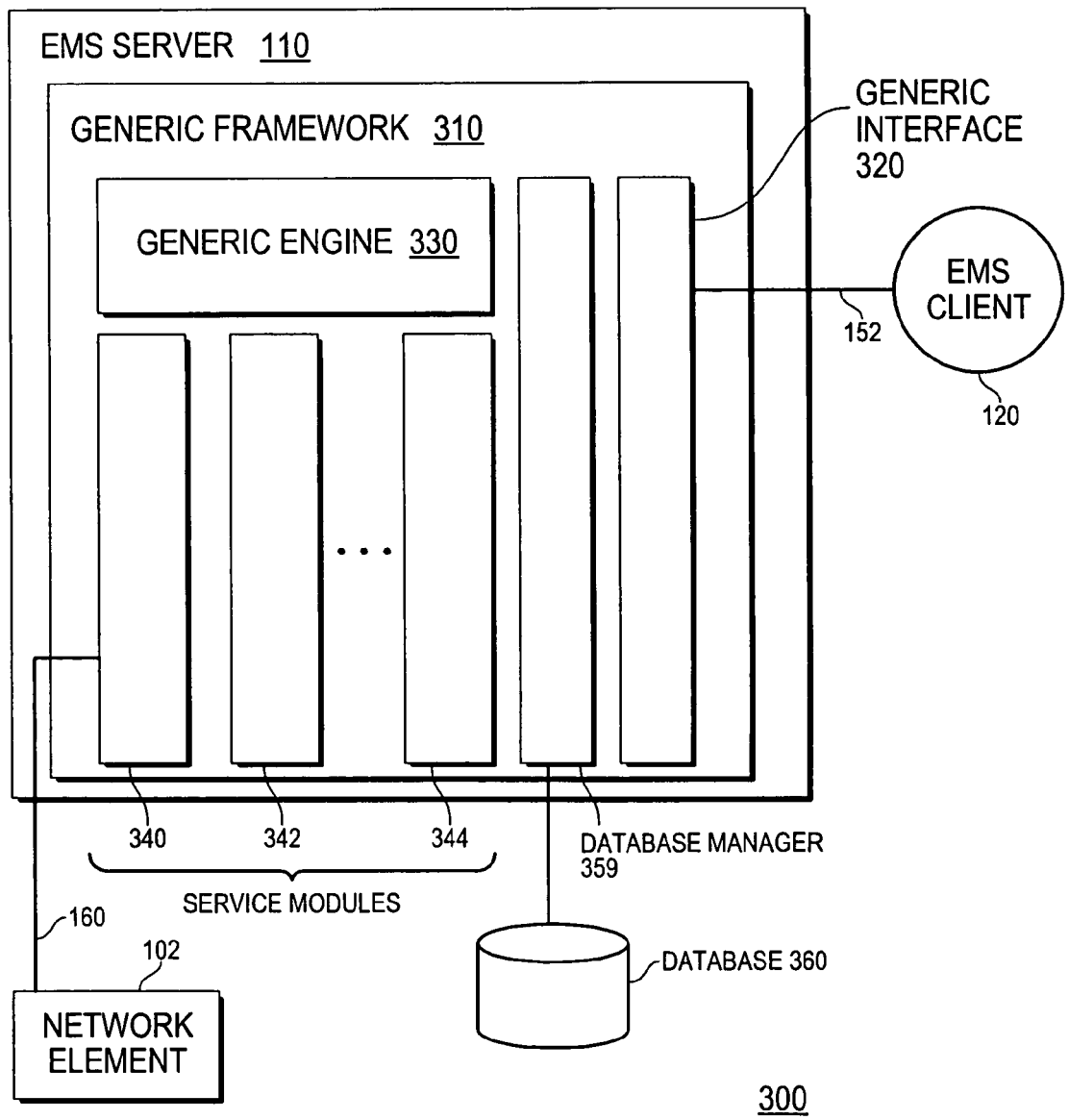
FIG. 3 is a block diagram of an EMS server according to an embodiment.

An EMS Server according to embodiments of the invention comprises a generic framework. Components of the generic framework will be described with reference to FIG. 3, which is a block diagram of an EMS server according to an embodiment. FIG. 3 depicts EMS server 110 having a generic framework 310. Generic framework 310 refers to a set of functional components within an EMS server that enable communications exchanged between EMS clients and the EMS server to be processed similarly by the EMS server, even if those communications involve different services. The processing performed by generic framework 310 shall be described in greater detail below.

As shown in FIG. 3, the generic framework comprises a generic interface 320, a generic engine 330, service modules 340, 342, 344, and a database manager 350. A generic interface, such as generic interface 320, refers to any generic interface that allows each EMS client to exchange communications with EMS server using the same interface regardless of which service is associated with the communication. The operation of generic interface 320 shall be described in further detail below.

A generic engine, such as generic engine 330, refers to any functional component that creates and stores instances of a generic record. Instances of a generic record are used by embodiments to store service data contained within communications from EMS clients. Service data is data that describes a particular service to be administered on the network element. The operation, of the generic engine 330 shall be described in further detail below.

A service module, such as service modules 340, 342, and 344, refers to any functional component capable of processing instances of a generic record. The service module processes instances of the generic record to obtain the service data contained therein. The service module exchanges XML documents with a network element that contains either service data or result data. Result data is data that describes the result of processing the service data at the network element. The operation of the service module shall be described in further detail below.

A database manager, such as database manager 350, refers to any functional component that allows components of the generic framework 310 to store data in a database.

An EMS client, such as EMS client 120 and 122 as shown in FIG. 1, refers to any software or hardware component that is capable of communicating with an EMS server and is capable of instructing the EMS server to administer a service on a network element. While only two EMS clients, namely EMS client 120 and 122, are depicted if FIG. 1, in various embodiments any number of EMS clients may be operationally connected to a particular EMS server. An EMS client may be, but need not be, configured to instruct the EMS to administer a different service on a network element than another EMS client.

A NMS Server, such as NMS server 130 as shown in FIG. 1, refers to any hardware or software component that is capable of monitoring an operational status of one or more EMS servers. An administrator may use an NMS server to monitor the status of one or more EMS servers as well as any network element that is the subject of a service which one of the EMS servers is provisioning. Thus, the administrator may use an NMS server to monitor the status of an entire system. While FIG. 1 depicts only one NMS server, namely NMS server 130, embodiments may deploy any number of NMS servers, including zero NMS servers.

Communications links 140 and 142 may be implemented by any medium or mechanism that provides for the exchange of data between a NMS server and an EMS server. Communications links 150 and 152 may be implemented by any medium or mechanism that provides for the exchange of data between an EMS client and an EMS server. Communications links 160, 162, and 164 may be implemented by any medium or mechanism that provides for the exchange of data between an EMS server and a network element. Examples of communications links 140, 142, 150, 152, 160, 162, and 164 include, without limitation, a network such as a Local Area Network (LAN), Wide Area Network (WAN), Ethernet or the Internet, or one or more terrestrial, satellite or wireless links.

Generic EMS Framework

Figure 2:
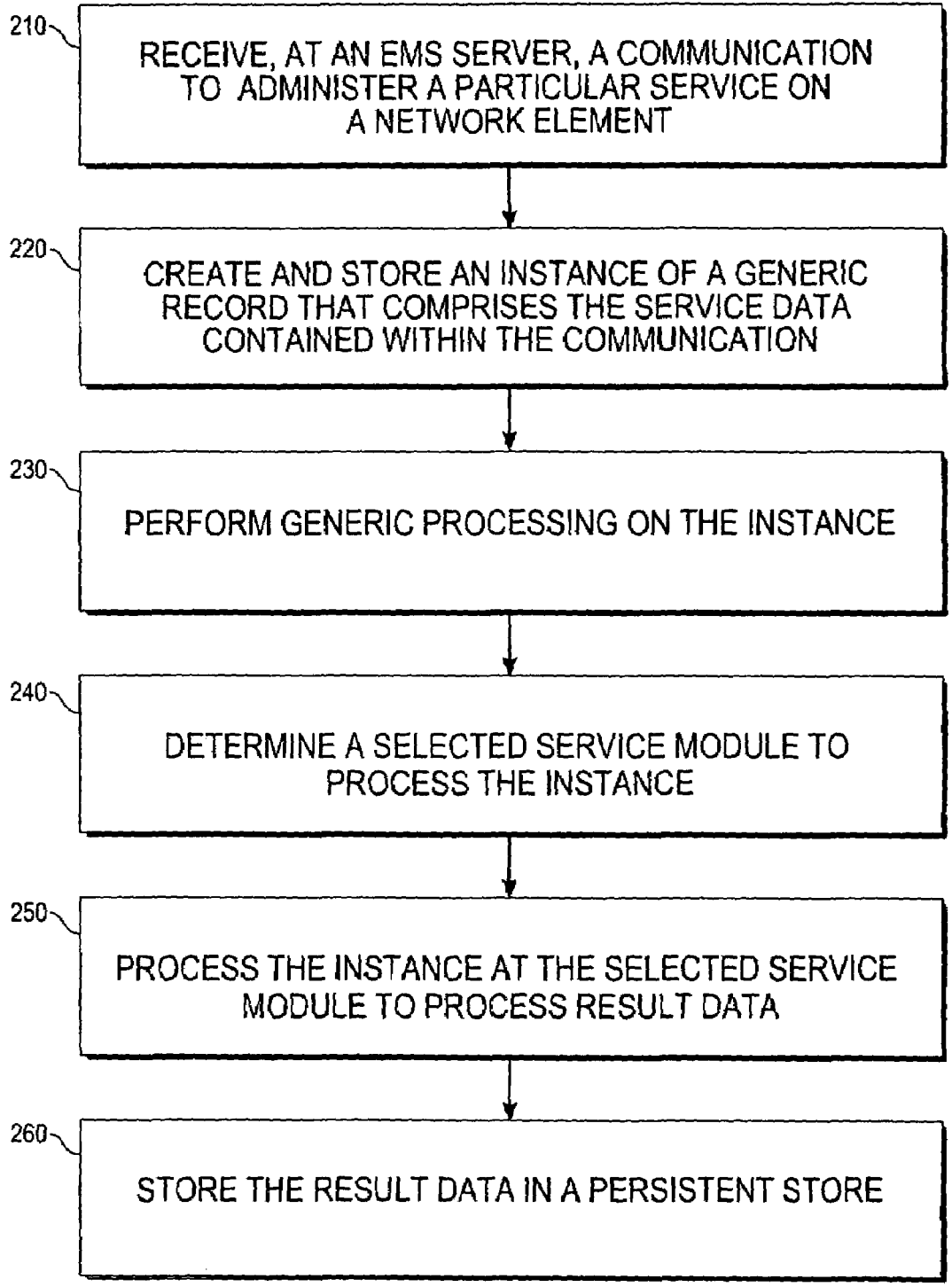
FIG. 2 is a flowchart illustrating the high level functional steps of an embodiment.

FIG. 2 is a flowchart 200 illustrating the high level functional steps of an embodiment. In performing the steps illustrated in flowchart 200, an EMS server may process communications exchanged between the EMS server and one or more EMS clients that involve different services similarly using the same generic framework. An EMS server configured to perform the functional steps illustrated in FIG. 2 may have its operation modified to provision a new service on one or more network elements without any change to the generic framework of the EMS server. The high level functional steps of FIG. 2 shall be explained below with reference to FIG. 3, which is a block diagram of an EMS server according to an embodiment.

While the steps depicted in FIG. 2 may be used to process any number of communications from any number of EMS clients to the EMS server, the processing of a single communication to administer a particular service on a network element shall now be described. In step 210, a communication to administer a particular service on a network element is received at an EMS server from an EMS client. The EMS server may be configured to provision one or more services onto one or more network elements. For example, with reference to FIG. 3, EMS server 110 may receive a communication to administer a particular service, such as Voice over IP, on network element 102 from EMS client 120. EMS server 110 may also be currently provisioning several other services on network element 102.

In an embodiment, the EMS server provides a generic interface using an exposed API to facilitate communicate between each EMS client and the EMS server. For example, EMS server 110 may provide generic interface 320 that exposes an API to each EMS client that allows each EMS client 120 to exchange communications with EMS server 110 using the CORBA protocol. As each EMS client 120 exchanges communications with the EMS server 110 using generic interface 320, each EMS client 120 may exchange communications with the EMS server 110 in the same fashion regardless of which service is associated with the communication.

In an embodiment, the communication received by the EMS server in step 210 is transmitted using the CORBA protocol. In another embodiment, generic interface 320 is configured to receive communications from EMS clients using a variety of transport protocols, e.g., CORBA, HTTP, or SSH.

The communication received in step 210 contains service data that describes the particular service to be administered on the network element. For example, if the particular service to be administered on the network element is Voice over IP, then the service data contains data that describes the Voice over IP service and describes how it is to be deployed on the network element. After the performance of step 210, processing proceeds to step 220.

In step 220, an instance of a generic record that stores the service data contained within the communication received in step 210 is created and stored. A generic record is any record that is capable of storing service data associated with any service. For example, a generic record may be embodied in the following pseudocode:

```
struct Request
{
    string          clientName;
    OperationTag    operation;
    RecordList      configRecordList;
};
```

In the above pseudocode example, clientName identifies which client transmitted the service data to the EMS server, operation identifies the operation of the service to be performed, and configRecordList refers to the set of name/value pairs that store data relating to the operation. The above pseudocode is merely illustrative, as other embodiments may create generic records using a different format or structure.

In an embodiment, the instance of the generic record that stores the service data contained within the communication received in step 210 is created by generic engine 330. The particular instance of the generic record created by generic engine 330 is a new generic record that conforms with the structure of the generic record. For example, if object-oriented technology is used in the performance step 220, then the generic record may be embodied in a class, and the instance may be embodied in a new instance of the generic record class. Generic engine 330 may employ a constructor to create the instance of the generic record. A constructor is any functional component that is capable of creating instances of a generic record. The operation of the constructor will be discussed in further detail below.

After constructing the instance of the generic record, generic engine 330 then stores the service data that was contained with the communication received in step 210 in the newly created instance of the generic record. Thereafter, generic engine 330 stores the instance with the service data, either in volatile or non-volatile memory.

In an embodiment, the generic record may be constructed to include one or more specific methods. The one or more specific methods may be used for performing special processing for service data of a certain type that does not need to be performed on service data of other types. For example, if a service of type XYZ requires that a special operation be performed, but no other service requires that operation to be performed, then the constructor constructs the instance of the generic record, which stores the service data, with the one or more specific methods that perform the operation. Thus, the operation may be performed on the service data associated with service type XYZ by performing the one or more specific methods comprised in the instance. Special methods that are defined in an instance of the generic record may be executed by various components of the generic framework 310 as necessary.

The generic engine 330 may construct the one or more specific methods using the constructor. The constructor determines an object type associated with the service data. The object type identifies what type of service is associated with the service data, as each service has service data of a different object type. The constructor may construct the instance to include the one or more specific methods if it is determined that the object type associated with the service data requires the addition of the one or more specific methods. In other embodiments, the constructor may use other attributes contained within the service data to identify the service associated with the service data and/or base a determination as to whether to construct the instance with one or more specific methods. For example, the service data may contain data, such as a label, that identifies that one or more specific methods should be included in the instance constructed to store the service data.

In an embodiment, in the performance of step 220, generic engine 330 performs a validation check on the service data to ensure that the service data conforms to a set of validation rules. The validation rules may be stored in a persistent store located at the generic engine 330 or at a location accessible to generic engine 330. The validation check may be performed to ensure that the service data received in the communication in step 210 is valid. If the service data does not pass one or more validation rules, then the EMS client that transmitted the communication that contained the service data may be notified by the EMS server that the service data contains one or more errors. After the performance of step 220, processing proceeds to step 230.

In step 230, generic processing is performed on the instance. Note that step 230 is optional, and certain embodiments do not perform step 230, but rather after the performance of step 220, processing proceeds directly to step 240. In embodiments that do perform step 230, the same generic processing is performed on any instance of the general record created in step 220 regardless of which service is associated with service data stored by the instance. In other words, if two different instances each contain service data associated with different services, then the same generic processing is still performed on both instances. In an embodiment, generic engine 330 performs step 230.

In an embodiment, the generic processing performed in step 230 includes logging information about the instance to a persistent store. The information logged about the instance includes any information about the receipt or content of the instance that may be of use at a later date. For example, the information logged about the instance may include, but is not limited to, when the instance was received, which EMS client transmitted the communication containing the service data stored within the instance, and the contents of the service data stored within the instance. The information may be logged to any persistent store accessible to the generic engine 330. For example, the generic engine may communicate with the database manager 350 to log the information in a database 360.

In an embodiment, the generic processing performed in step 230 includes performing error handling on any errors associated with the instance. In another embodiment, the generic processing performed in step 230 includes performing one or more security checks on the instance. For example, a set of permissions that are associated with the user who transmitted the communication received in step 210 may be checked to determine if the user has sufficient privilege to transmit the communication containing the service data received in step 210.

Note that in embodiments of the invention, the generic processing performed in step 230 may include one or more of the above discussed operations. Thus, in an embodiment, the generic processing of step 230 may include logging information about the instance to a persistent store, performing one or more security checks on the instance, and performing error handling on any errors associated with the instance. After the performance of step 230, processing proceeds to step 240.

In step 240, a service module is selected to process the instance created in step 220 based on which service is associated with the service data stored in the instance. In an embodiment, the service module selected in step 240 is configured to process instances of the generic record storing service data associated with the same service that is associated with the service data stored in the instance. For example, if the instance of the general record created in step 220 stores service data associated with the Voice over IP service, then the service module selected in step 240 is configured to process instances of the generic record storing service data associated with the Voice over IP service. Thus, while generic framework 310 of EMS server 110 may include any number of service modules 340-344, in order for EMS server to provision the service associated with the service data stored within the instance, the EMS server must have a service module configured to process instances of the generic record storing service data of the same type as the instance to be processed. In other words, if the instance of the general record created in step 220 stores service data associated with service ABC, then EMS server 110 must comprise a service module configured to process instances of the generic record storing service data associated with service ABC to provision service ABC to network elements.

In another embodiment, in step 240, the service module selected to process the instance created in step 220 is based on the type of network element associated with the service data stored in the instance. In such an embodiment, a particular service module processes all generic records associated with a particular type of network element. Thus, a particular service module is able to process generic records associated with a plurality of services for a particular type of network element. After the performance of step 240, processing proceeds to step 250.

In step 250, the instance is processed at the service module selected in step 240 to produce result data that describes the result of processing the service data at the network element. The selected service module transmits information to one or more network elements identified in the service data stored in the instance. The information transmitted to the one or more network elements enables each of the one or more network elements to receive the service. In an embodiment, the service data identifies which of the one or more network elements in the system 100 should receive the service associated with the service data. In another embodiment, information is maintained by generic engine 330 that identifies which of the one or more network elements in the system 100 should receive each service supported by EMS server 110.

In an embodiment, the selected service module processes the instance by creating an outbound XML document containing the service data stored within the instance. The outbound XML document is transmitted to the one or more network elements identified to receive the service. A network element receiving the outbound XML document reads the service data from the outbound XML document and processes the service data. Thereafter, a network element that processed the service data creates a responsive XML document that contains result data that describes the result of processing the service data at the network element. Thereafter, the network element that created the responsive XML document transmits the responsive XML document to the EMS server.

The EMS server receives the response XML document and reads the result data from the responsive XML document. The EMS server creates a new instance of the generic record, and thereafter, stores the result data in the instance of the generic record that was just created. By storing the result data in an instance of the generic record, the result data that describes the result of processing any service at a network element can be processed by the generic framework 310, since the structure of the generic record is known to the components of the generic framework 310. After the performance of step 250, processing proceeds to step 260.

In step 260, the result data produced in step 250 is stored. In an embodiment, the instance created in step 250 to store the result data is processed to retrieve the result data. In an embodiment, the selected service module stores the result data by communicating with the database manager 350 to instruct the database manager 350 to store the result data in the database 360. Database 360, which may be used to store the result data, refers to any persistent store that is capable of durably storing data. Non-limiting, illustrative examples of database 360 include a relational database, a hierarchical database, an object oriented database, and a multi-dimensional database.

In an embodiment, database manager 350 stores result data in the database 360 by consulting a set of information that maps fields of the generic record to specific columns and tables in database 360. The database manager 350 determines how to store the result data in the database 360 based upon the consulted set of information. The database manager 350 can automatically construct the SQL queries needed to retrieve or store data from the database 360 based upon the consulted set of information. The set of information may be stored at the database manager 350 or at a location accessible to the database manager 350.

While the steps depicted in FIG. 2 have been described above with reference to a single communication to administer a particular service on a network element, other embodiments may process any number of communications from any number of EMS clients to the EMS server. In an embodiment, an administrator may use EMS client 122 to transmit one or more communications to EMS server 110 to cause EMS server to provision multiple services to network element 102.

In another embodiment, an administrator may use EMS client 122 to transmit one or more communications to EMS server 110 to cause EMS server to provision the same services to multiple network elements, such as network elements 102, 104, and 106. EMS server 110 may be configured to provision a service to any network element in system 100, regardless of the type, model, or manufacturer of network element, because the generic framework 310 of the EMS server 110 may comprise a particular service module 340 that is configured to provision the service to the network element with those characteristics. Additional description of how the generic framework 310 of the EMS server can support the provisioning of any service to any network element is described below in the section entitled "Adding a New Service to the EMS Server."

As the generic framework 310 processes instances of the generic record, many advantages are yielded due to the commonality of processing. Database interactions involving the storage or retrieval of data from or to an instance of the generic record may be automated because the database manager 350 is configured to read and write data from an instance of the generic record. Likewise, data conversions, error handling, and request/response handling can be automated because all service data is stored in an instance of the generic record, regardless of which service is associated with the service data.

Adding a New Service to The EMS Server

Figure 4:
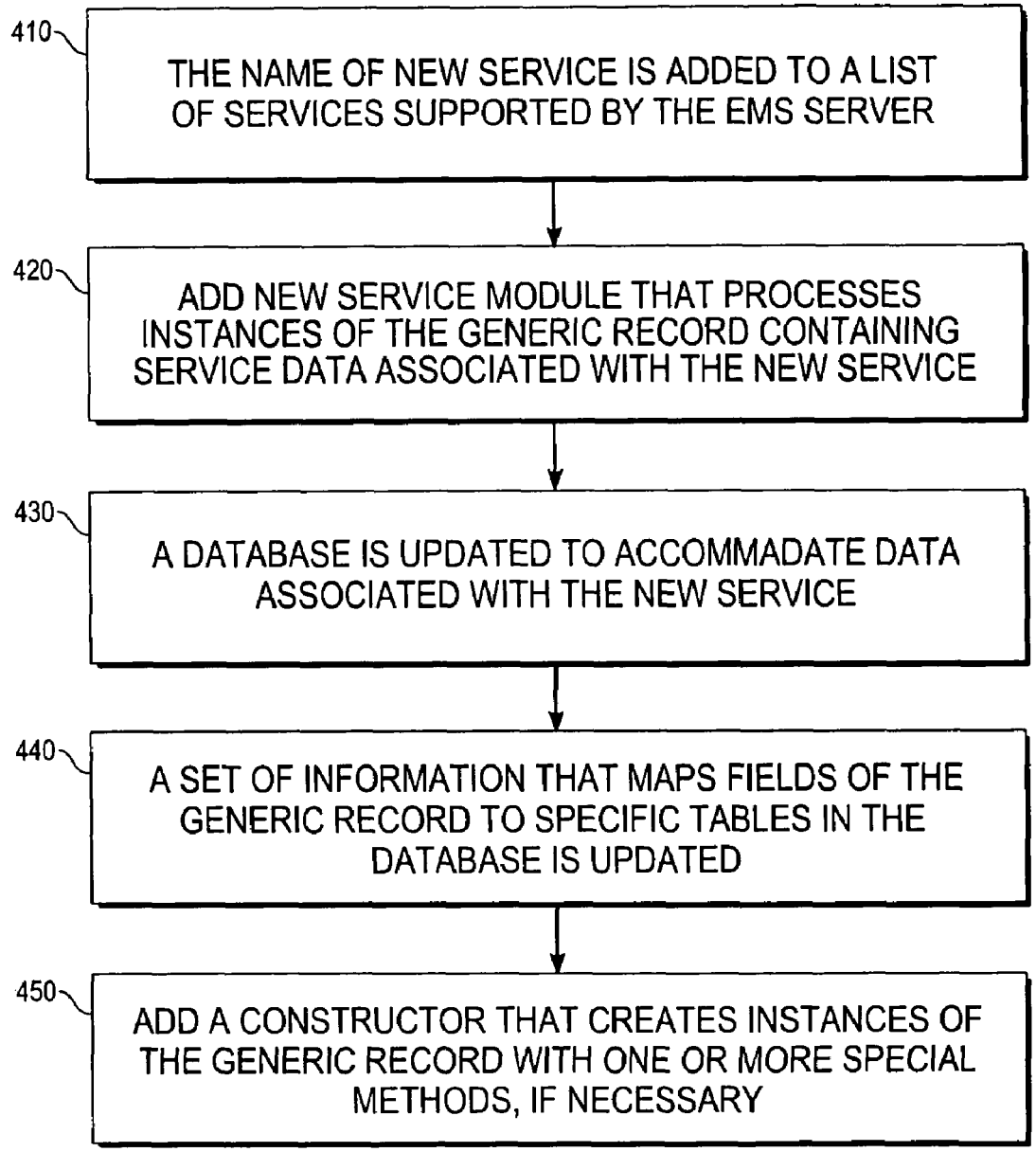
FIG. 4 is a flowchart illustrating the functional steps in adding a new service module to the generic framework of an EMS server.

The generic framework 310 allows one to configure an EMS server to support the provisioning of a new service with relative ease, minimal time requirements, and without changing the generic framework 310. FIG. 4 is a flowchart illustrating the functional steps in adding a new service to the generic framework of an EMS server. Note that the sequence of steps in flowchart 400 is merely illustrative; other embodiments may perform the sequence of steps illustrated in FIG. 4 in any order.

Initially, in step 410, the name of the new service is added to a list of services supported by the EMS server. Step 410 may be performed by a user transmitting a communication from an EMS client to the EMS server that instructs the EMS server to add a new service with a name contained within the communication. In an embodiment, the list of services supported by the EMS server is maintained by the EMS server at the generic engine 330. The list of services supported by the EMS server is used by the EMS server during initialization of the EMS server. Initialization of the EMS server is described in further detail below.

In step 420, a new service module that processes instances of the generic record containing service data associated with the new service is added to the generic framework of the EMS server. In an embodiment, step 420 may be performed by a user transmitting a communication from an EMS client to the EMS server that instructs the EMS server to add a new service module in accordance with information contained in the communication.

In an embodiment, a service module processes instances of a generic record for a specific service and for a specific type of network element, e.g., a type of network element may include a particular manufacturer, model, or kind of network element. A new service module is created in the generic framework of an EMS server for each new service that the EMS server supports and for each specific type of network element to which the new service may be provisioned.

To illustrate, assume a user associated with EMS client 120 wishes to add a new service XYZ to EMS server 110, and the user wishes network elements 102, 104, and 106 to receive the service. Further assume that network elements 102 and 104 are of the same type, but network element 106 is a different type than network elements 102 and 104. Consequently, two new service modules will need to be added to the generic framework 310 of EMS server 110 because (a) one service module is needed to provision service XYZ to network elements 102 and 104, and (b) another service module is needed to provision service XYZ to network element 106.

In step 430, a database is updated to accommodate data associated with the new service. Step 430 may be performed by adding tables to database 360 that have one or more columns which are configured to store data associated with the new service. Database manager 350 may perform step 430 based upon information contained in a received communication from a user that describes the data requirements for the new service.

In step 440, a set of information that maps fields of the generic record to specific tables in the database is updated to reflect where result data for the new service is stored in the database. The set of information may be stored at database manager 350 or at a location accessible to the database manager 350. Database manager 350 may perform step 440 based upon information contained in a received communication from a user that describes the data requirements for the new service.

In step 450, if the new service requires that instances of the generic record that contain service data associated with the new service comprise one or more special methods, then the constructor is updated to create instances of the generic record with the one or more special methods. Step 450 may be performed by generic engine 330 in accordance with information contained in a communication received by the EMS server sent from an EMS client.

Initializing the EMS Server

The generic framework 310 enables the EMS server 110 to automatically discover the configuration information for any network element, and store the discovered configuration information in the database 360. The EMS server 110 may perform automatic discovery when EMS server 110 is initially turned on to populate database 360 with configuration information for each network element to which EMS server 110 provides a service. In other words, prior to performing the functional steps illustrated in FIG. 2, the EMS server has automatically discovered the configuration information for any network element to which the EMS server provides a service.

Figure 5:
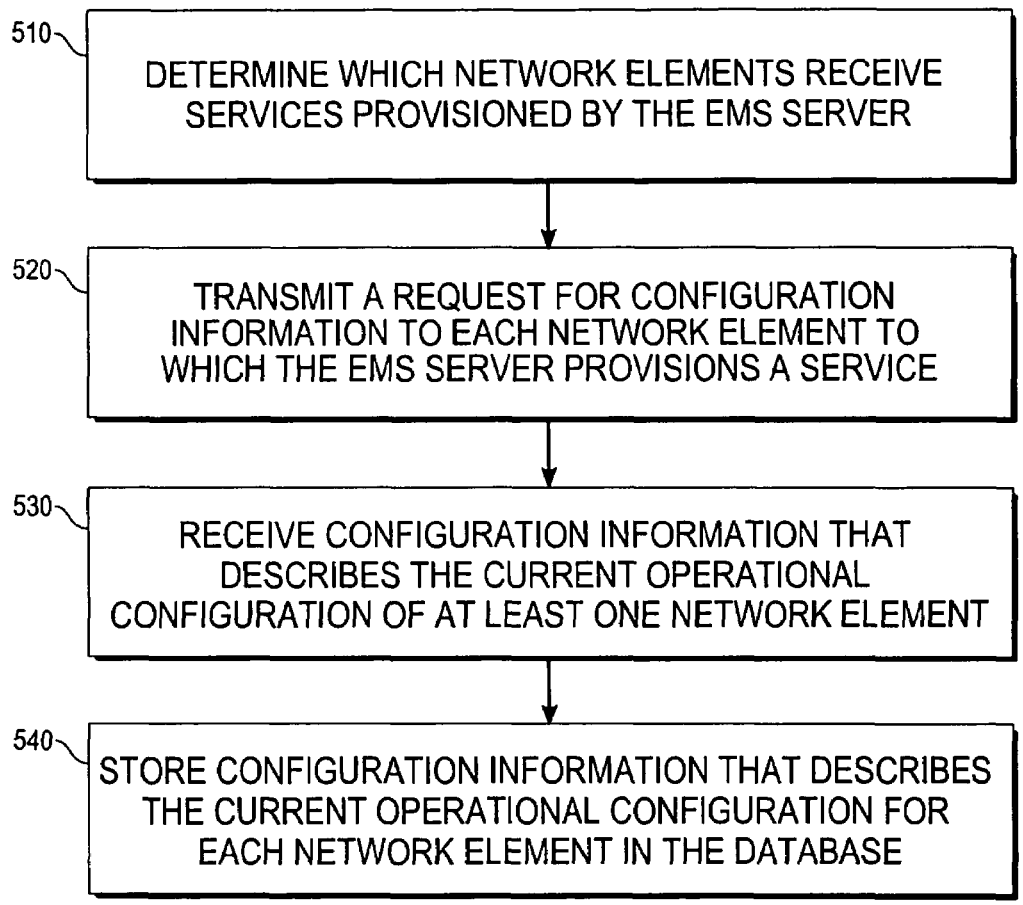
FIG. 5 is a flowchart illustrating the functional steps involved in retrieval of the configuration information of one or more network elements according to an embodiment.

FIG. 5 is a flowchart illustrating the functional steps involved in retrieval of the configuration information for one or more network elements according to an embodiment. Note that the sequence of steps in flowchart 500 is merely illustrative; other embodiments may perform the sequence of steps illustrative in FIG. 5 in any order.

In step 510, prior to receiving the communication received in step 210, the EMS server uses a list of supported services to determine what services does the EMS server support. The list of supported services also describes which network elements in system 100 are associated with each of the set of services that the EMS server supports. In an embodiment, the generic engine 330 maintains the list of supported services.

In step 520, the EMS server transmits a request for configuration information to each network element to which the EMS server provisions a service. After receipt, the request is processed at each network element receiving the request. After a network element processes the request, the network element transmits the configuration information that describes the current operational configuration of the network element to the EMS server.

In step 530, the EMS server receives, from at least one network element, configuration information that describes the current operational configuration of the network element that sent the configuration information. In other words, the EMS server receives configuration information that describes the current operational configuration from at lease one network element to which the EMS server requested configuration information from in step 520.

In step 540, the received configuration information describing the current operational configuration for each network element is stored in the database. For example, the received configuration information may be stored in database 360. Thereafter, when an EMS client makes a configuration change to a particular network element or the EMS server requires the current operational configuration of a particular network element to deploy a service on that particular network element, the EMS server may retrieve the current operational configuration of that particular network element by consulting database 360.

Implementing Mechanisms

Figure 6:
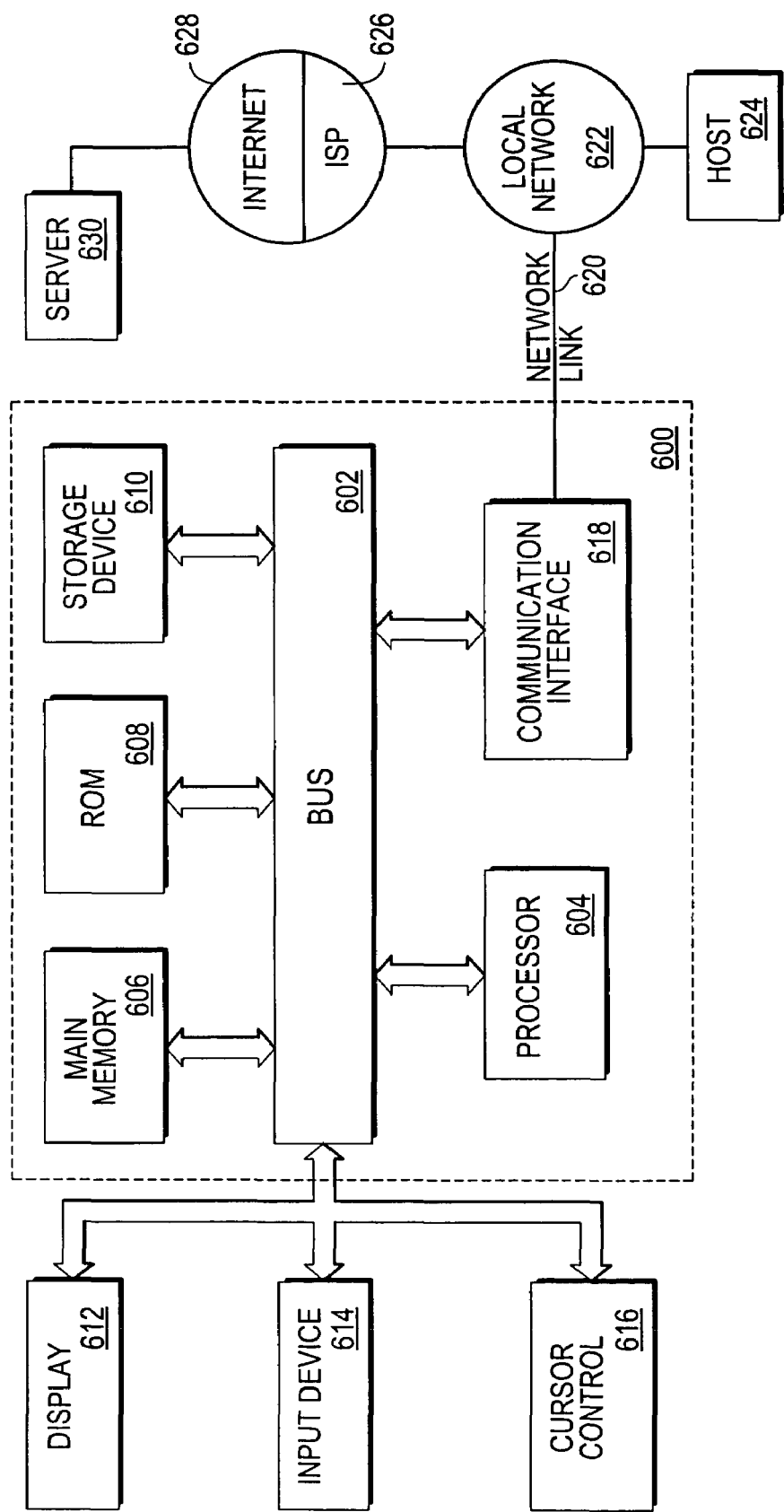
FIG. 6 is a block diagram that illustrates a computer system upon which an embodiment may be implemented.

FIG. 6 is a block diagram that illustrates a computer system 600 upon which an embodiment of an EMS server 110 may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   receiving, at a network element management system ("EMS") server from an EMS client, a communication to administer a particular service on a network element, wherein the communication contains service data that describes the particular service to be administered on the network element, and wherein the particular service is one of a set of services;
   creating and storing an instance of a generic record that comprises the service data;
   determining a selected service module from a set of service modules to process the instance based on which service is associated with the service data stored in the instance, and wherein the selected service module is configured to process instances of the generic record storing service data associated with the particular service; and
   processing the instance at the selected service module to produce result data that describes the result of processing the service data at the network element;
   wherein the steps of receiving, creating and storing, determining, and processing are performed by one or more computing devices.

2. The method of claim 1, further comprising:
   performing generic processing on the instance, wherein the same generic processing is performed on any instance of the generic record regardless of which service is associated with service data stored by the instance.

3. The method of claim 2, wherein performing generic processing comprises:
   logging information about the instance to a persistent store.

4. The method of claim 2, wherein performing generic processing comprises:
   performing one or more security checks on the instance.

5. The method of claim 2, wherein performing generic processing comprises:
   performing error handling on any errors associated with the instance.

6. The method of claim 2, wherein performing generic processing comprises:
   logging information about the instance to a persistent store;
   performing one or more security checks on the instance; and
   performing error handling on any errors associated with the instance.

7. The method of claim 1, wherein the instance is a first instance, and wherein the processing step further comprises:
   creating an outbound XML document containing the service data stored within the first instance;
   transmitting the outbound XML document to the network element;
   receiving a responsive XML document from the network element, wherein the responsive XML document contains the result data; and
   at the EMS server, constructing a second instance containing the result data.

8. The method of claim 7, wherein storing the result data in a database comprises:
   processing the second instance to retrieve the result data from the second instance.

9. The method of claim 1, further comprising:
   defining a customizable method to process an instance storing service data associated with a specific service in the set of services.

10. The method of claim 9, further comprising:
    determining if the instance stores service data associated with the specific service; and executing the customizable method on the instance only upon determining that the instance stores service data associated with the specific service.

11. The method of claim 1, further comprising:
storing the result data in a persistent store.

12. The method of claim 1, wherein the EMS client is one of a set of EMS clients, and wherein each EMS client in the set of EMS clients administers a different service in the set of services on the network element.

13. The method of claim 1, wherein creating and storing the instance of the generic record further comprises:
determining an object type of the service data; and
constructing the instance to include one or more specific methods based upon the object type.

14. The method of claim 1, wherein creating and storing the instance of the generic record further comprises:
performing a validation check on the service data to ensure that the service data conforms to a set of validation rules.

15. The method of claim 1, wherein storing comprises:
consulting a set of information that maps fields of the generic record to specific tables in the database; and
determining how to store the result data based upon the set of information.

16. The method of claim 1, further comprising:
configuring the EMS server to support a new service in the set of services by performing:
adding a new service module to the EMS that processes instances of the generic record containing service data associated with the new service;
updating a database to accommodate data associated with the new service;
if the new service requires that instances of the generic record that contain service data associated with the new service comprise one or more special methods, then adding a constructor that creates instances of the generic record with the one or more special methods; and
updating a set of information that maps fields of the generic record to specific tables in the database to reflect where result data for the new service is stored in the database.

17. The method of claim 1, further comprising:
configuring the EMS server to support a new service by adding the new service to a list of supported services by the EMS server.

18. The method of claim 1, wherein the network element is one of one or more network elements, and further comprising:
prior to receiving the communication, the EMS server using a list of supported services to determine which services in the set of services are supported by the EMS server, wherein the list of supported services also describes which network elements in the set of one or more network elements are associated with each of the set of services;
transmitting, from the EMS server to each of the one or more network elements, a request for configuration information of the recipient of the request;
receiving, from at least one of the one or more network elements, configuration information that describes the current operational configuration of the network element which sent the configuration information; and
storing the received configuration information in the database.

19. A volatile or non-volatile machine-readable medium storing one or more sequences of instructions, wherein execution of the one or more sequences of instructions by one or more processors causes the one or more processors to perform the steps of:
receiving, at a network element management system ("EMS") server from an EMS client, a communication to administer a particular service on a network element, wherein the communication contains service data that describes the particular service to be administered on the network element, and wherein the particular service is one of a set of services;
creating and storing an instance of a generic record that comprises the service data;
determining a selected service module from a set of service modules to process the instance based on which service is associated with the service data stored in the instance, and wherein the selected service module is configured to process instances of the generic record storing service data associated with the particular service; and
processing the instance at the selected service module to produce result data that describes the result of processing the service data at the network element.

20. The machine-readable medium of claim 19, wherein execution of the one or more sequences of instructions by the one or more processors further causes the one or more processors to perform the step of:
performing generic processing on the instance, wherein the same generic processing is performed on any instance of the generic record regardless of which service is associated with service data stored by the instance.

21. The machine-readable medium of claim 20, wherein performing generic processing comprises:
logging information about the instance to a persistent store.

22. The machine-readable medium of claim 20, wherein performing generic processing comprises:
performing one or more security checks on the instance.

23. The machine-readable medium of claim 20, wherein performing generic processing comprises:
performing error handling on any errors associated with the instance.

24. The machine-readable medium of claim 20, wherein performing generic processing comprises:
logging information about the instance to a persistent store;
performing one or more security checks on the instance; and
performing error handling on any errors associated with the instance.

25. The machine-readable medium of claim 19, wherein the instance is a first instance, and wherein the processing step further comprises:
creating an outbound XML document containing the service data stored within the first instance;
transmitting the outbound XML document to the network element;
receiving a responsive XML document from the network element, wherein the responsive XML document contains the result data; and
at the EMS server, constructing a second instance containing the result data.

26. The machine-readable medium of claim 25, wherein storing the result data in a database comprises:
processing the second instance to retrieve the result data from the second instance.

27. The machine-readable medium of claim 19, wherein execution of the one or more sequences of instructions by the one or more processors further causes the one or more processors to perform the step of:

defining a customizable method to process an instance storing service data associated with a specific service in the set of services.

28. The machine-readable medium of claim 27, wherein execution of the one or more sequences of instructions by the one or more processors further causes the one or more processors to perform the steps of:
determining if the instance stores service data associated with the specific service; and
executing the customizable method on the instance only upon determining that the instance stores service data associated with the specific service.

29. The machine-readable medium of claim 19, wherein execution of the one or more sequences of instructions by the one or more processors further causes the one or more processors to perform the step of:
storing the result data in a persistent store.

30. The machine-readable medium of claim 19, wherein the EMS client is one of a set of EMS clients, and wherein each EMS client in the set of EMS clients administers a different service in the set of services on the network element.

31. The machine-readable medium of claim 19, wherein creating and storing the instance of the generic record further comprises:
determining an object type of the service data; and
constructing the instance to include one or more specific methods based upon the object type.

32. The machine-readable medium of claim 19, wherein creating and storing the instance of the generic record further comprises:
performing a validation check on the service data to ensure that the service data confirms to a set of validation rules.

33. The machine-readable medium of claim 19, wherein storing comprises:
consulting a set of information that maps fields of the generic record to specific tables in the database; and
determining how to store the result data based upon the set of information.

34. The machine-readable medium of claim 19, further comprising:
configuring the EMS server to support a new service in the set of services by performing:
adding a new service module to the EMS that processes instances of the generic record containing service data associated with the new service;
updating a database to accommodate data associated with the new service;
if the new service requires that instances of the generic record that contain service data associated with the new service comprise one or more special methods, then adding a constructor that creates instances of the generic record with the one or more special methods; and
updating a set of information that maps fields of the generic record to specific tables in the database to reflect where result data for the new service is stored in the database.

35. The machine-readable medium of claim 19, wherein execution of the one or more sequences of instructions by the one or more processors further causes the one or more processors to perform the step of:
configuring the EMS server to support a new service by adding the new service to a list of supported services by the EMS server.

36. The machine-readable medium of claim 19, wherein the network element is one of one or more network elements, and wherein execution of the one or more sequences of instructions by the one or more processors further causes the one or more processors to perform the steps of:
prior to receiving the communication, the EMS server using a list of supported services to determine which services in the set of services are supported by the EMS server, wherein the list of supported services also describes which network elements in the set of one or more network elements are associated with each of the set of services;
transmitting, from the EMS server to each of the one or more network elements, a request for configuration information of the recipient of the request;
receiving, from at least one of the one or more network elements, configuration information that describes the current operational configuration of the network element which sent the configuration information; and
storing the received configuration information in the database.

37. An apparatus, comprising:
one or more processors;
means for receiving, at a network element management system ("EMS") server from an EMS client, a communication to administer a particular service on a network element, wherein the communication contains service data that describes the particular service to be administered on the network element, and wherein the particular service is one of a set of services;
means for creating and storing an instance of a generic record that comprises the service data;
means for determining a selected service module from a set of service modules to process the instance based on which service is associated with the service data stored in the instance, and wherein the selected service module is configured to process instances of the generic record storing service data associated with the particular service; and
means for processing the instance at the selected service module to produce result data that describes the result of processing the service data at the network element.

38. The apparatus of claim 37, further comprising:
means for performing generic processing on the instance, wherein the same generic processing is performed on any instance of the generic record regardless of which service is associated with service data stored by the instance.

39. The apparatus of claim 38, wherein the means for performing generic processing comprises:
means for logging information about the instance to a persistent store.

40. The apparatus of claim 38, wherein the means for performing generic processing comprises:
means for performing one or more security checks on the instance.

41. The apparatus of claim 38, wherein the means for performing generic processing comprises:
means for performing error handling on any errors associated with the instance.

42. The apparatus of claim 38, wherein the means for performing generic processing comprises:
means for logging information about the instance to a persistent store;
means for performing one or more security checks on the instance; and
means for performing error handling on any errors associated with the instance.

43. The apparatus of claim 37, wherein the instance is a first instance, and wherein the means for processing further comprises:
    means for creating an outbound XML document containing the service data stored within the first instance;
    means for transmitting the outbound XML document to the network element;
    means for receiving a responsive XML document from the network element, wherein the responsive XML document contains the result data; and
    means for constructing, at the EMS server, a second instance containing the result data.

44. The apparatus of claim 43, wherein the means for storing the result data in a database comprises:
    means for processing the second instance to retrieve the result data from the second instance.

45. The apparatus of claim 37, further comprising:
    means for defining a customizable method to process an instance storing service data associated with a specific service in the set of services.

46. The apparatus of claim 45, further comprising:
    means for determining if the instance stores service data associated with the specific service; and
    means for executing the customizable method on the instance only upon determining that the instance stores service data associated with the specific service.

47. The apparatus of claim 37, further comprising:
    means for storing the result data in a persistent store.

48. The apparatus of claim 37, wherein the EMS client is one of a set of EMS clients, and wherein each EMS client in the set of EMS clients administers a different service in the set of services on the network element.

49. The apparatus of claim 37, wherein the means for creating and storing the instance of the generic record further comprises:
    means for determining an object type of the service data; and
    means for constructing the instance to include one or more specific methods based upon the object type.

50. The apparatus of claim 37, wherein the means for creating and storing the instance of the generic record further comprises:
    means for performing a validation check on the service data to ensure that the service data confirms to a set of validation rules.

51. The apparatus of claim 37, wherein the means for storing comprises:
    means for consulting a set of information that maps fields of the generic record to specific tables in the database; and
    means for determining how to store the result data based upon the set of information.

52. The apparatus of claim 37, further comprising:
    means for configuring the EMS server to support a new service in the set of services by performing:
        adding a new service module to the EMS that processes instances of the generic record containing service data associated with the new service;
        updating a database to accommodate data associated with the new service;
        if the new service requires that instances of the generic record that contain service data associated with the new service comprise one or more special methods, then adding a constructor that creates instances of the generic record with the one or more special methods; and
        updating a set of information that maps fields of the generic record to specific tables in the database to reflect where result data for the new service is stored in the database.

53. The apparatus of claim 37, further comprising:
    means for configuring the EMS server to support a new service by adding the new service to a list of supported services by the EMS server.

54. The apparatus of claim 37, wherein the network element is one of one or more network elements, and further comprising:
    means for, prior to receiving the communication, using a list of supported services to determine which services in the set of services are supported by the EMS server, wherein the list of supported services also describes which network elements in the set of one or more network elements are associated with each of the set of services;
    means for transmitting, from the EMS server to each of the one or more network elements, a request for configuration information of the recipient of the request;
    means for receiving, from at least one of the one or more network elements, configuration information that describes the current operational configuration of the network element which sent the configuration information; and
    means for storing the received configuration information in the database.

55. An apparatus comprising one or more processors configured to perform the steps of:
    receiving, at a network element management system ("EMS") server from an EMS client, a communication to administer a particular service on a network element, wherein the communication contains service data that describes the particular service to be administered on the network element, and wherein the particular service is one of a set of services;
    creating and storing an instance of a generic record that comprises the service data;
    determining a selected service module from a set of service modules to process the instance based on which service is associated with the service data stored in the instance, and wherein the selected service module is configured to process instances of the generic record storing service data associated with the particular service; and
    processing the instance at the selected service module to produce result data that describes the result of processing the service data at the network element.

56. The apparatus of claim 55, wherein the memory further comprises one or more additional instructions which, when executed by the one or more processors, cause the one or more processors to perform the step of:
    performing generic processing on the instance, wherein the same generic processing is performed on any instance of the generic record regardless of which service is associated with service data stored by the instance.

57. The apparatus of claim 56, wherein performing generic processing comprises:
    logging information about the instance to a persistent store.

58. The apparatus of claim 56, wherein performing generic processing comprises:
    performing one or more security checks on the instance.

59. The apparatus of claim 56, wherein performing generic processing comprises:
    performing error handling on any errors associated with the instance.

60. The apparatus of claim 56, wherein performing generic processing comprises:
  logging information about the instance to a persistent store;
  performing one or more security checks on the instance; and
  performing error handling on any errors associated with the instance.

61. The apparatus of claim 55, wherein the memory further comprises one or more additional instructions which, when executed by the one or more processors, cause the one or more processors to perform the step of:
  storing the result data in a persistent store.

62. The apparatus of claim 61, wherein storing the result data in a database comprises:
  processing the second instance to retrieve the result data from the second instance.

63. The apparatus of claim 55, wherein the memory further comprises one or more additional instructions which, when executed by the one or more processors, cause the one or more processors to perform the step of:
  defining a customizable method to process an instance storing service data associated with a specific service in the set of services.

64. The apparatus of claim 63, wherein the memory further comprises one or more additional instructions which, when executed by the one or more processors, cause the one or more processors to perform the steps of:
  determining if the instance stores service data associated with the specific service; and
  executing the customizable method on the instance only upon determining that the instance stores service data associated with the specific service.

65. The apparatus of claim 55, wherein the EMS client is one of a set of EMS clients, and wherein each EMS client in the set of EMS clients administers a different service in the set of services on the network element.

66. The apparatus of claim 55, wherein creating and storing the instance of the generic record further comprises:
  determining an object type of the service data; and
  constructing the instance to include one or more specific methods based upon the object type.

67. The apparatus of claim 55, wherein creating and storing the instance of the generic record further comprises:
  performing a validation check on the service data to ensure that the service data confirms to a set of validation rules.

68. The apparatus of claim 55, wherein the instance is a first instance, and wherein the processing step further comprises:
  creating an outbound XML document containing the service data stored within the first instance;
  transmitting the outbound XML document to the network element;
  receiving a responsive XML document from the network element, wherein the responsive XML document contains the result data; and
  at the EMS server, constructing a second instance containing the result data.

69. The apparatus of claim 55, wherein storing comprises:
  consulting a set of information that maps fields of the generic record to specific tables in the database; and
  determining how to store the result data based upon the set of information.

70. The apparatus of claim 55, wherein the memory further comprises one or more additional instructions which, when executed by the one or more processors, cause the one or more processors to perform the step of:
  configuring the EMS server to support a new service in the set of services by performing:
    adding a new service module to the EMS that processes instances of the generic record containing service data associated with the new service;
    updating a database to accommodate data associated with the new service;
    if the new service requires that instances of the generic record that contain service data associated with the new service comprise one or more special methods, then adding a constructor that creates instances of the generic record with the one or more special methods; and
    updating a set of information that maps fields of the generic record to specific tables in the database to reflect where result data for the new service is stored in the database.

71. The apparatus of claim 55, wherein the memory further comprises one or more additional instructions which, when executed by the one or more processors, cause the one or more processors to perform the step of:
  configuring the EMS server to support a new service by adding the new service to a list of supported services by the EMS server.

72. The apparatus of claim 55, wherein the network element is one of one or more network elements, and wherein the memory further comprises one or more additional instructions which, when executed by the one or more processors, cause the one or more processors to perform the steps of:
  prior to receiving the communication, the EMS server using a list of supported services to determine which services in the set of services are supported by the EMS server, wherein the list of supported services also describes which network elements in the set of one or more network elements are associated with each of the set of services;
  transmitting, from the EMS server to each of the one or more network elements, a request for configuration information of the recipient of the request;
  receiving, from at least one of the one or more network elements, configuration information that describes the current operational configuration of the network element which sent the configuration information; and
  storing the received configuration information in the database.

73. A method for provisioning a service to a network element, comprising:
  deploying the service on the network element using a network element management system ("EMS") server,
  wherein the EMS server comprises a generic framework which stores service data received from an EMS client in an instance of a generic record, wherein the generic framework comprises a generic engine and a set of service modules,
  wherein the EMS server uses the generic engine to process the instance regardless of which service is associated with the service data, wherein the generic engine logs information about the instance, and
  wherein the EMS server selects a particular service module from the set of service modules to process the instance based on which service is associated with the service data stored in the instance;
  wherein the step of deploying the service on the network element is performed by one or more computing devices.

74. A volatile or non-volatile machine-readable medium storing one or more sequences of instructions for provisioning a service to a network element, wherein execution of the one or more sequences of instructions by one or more processors causes the one or more processors to perform the step of:

deploying the service on the network element using a network element management system ("EMS") server, wherein the EMS server comprises a generic framework which stores service data received from an EMS client in an instance of a generic record, wherein the generic framework comprises a generic engine and a set of service modules, wherein the EMS server uses the generic engine to process the instance regardless of which service is associated with the service data, wherein the generic engine logs information about the instance, and wherein the EMS server selects a particular service module from the set of service modules to process the instance based on which service is associated with the service data stored in the instance.

75. An apparatus for provisioning a service to a network element, comprising:

one or more processors;

means for deploying the service on the network element using a network element management system ("EMS") server, wherein the EMS server comprises a generic framework which stores service data received from an EMS client in an instance of a generic record, and wherein the generic framework comprises a generic engine and a set of service modules;

means for processing the instance regardless of which service is associated with the service data;

means for logging information about the instance, and means for selecting a particular service module from the set of service modules to process the instance based on which service is associated with the service data stored in the instance.

76. An apparatus for provisioning a service to a network element comprising one or more processors configured to perform the step of:

deploying the service on the network element using a network element management system ("EMS") server, wherein the EMS server comprises a generic framework which stores service data received from an EMS client in an instance of a generic record, wherein the generic framework comprises a generic engine and a set of service modules, wherein the EMS server using the generic engine to process the instance regardless of which service is associated with the service data, wherein the generic engine logs information about the instance, and wherein the EMS server selects a particular service module from the set of service modules to process the instance based on which service is associated with the service data stored in the instance.

* * * * *

UNITED STATES PATENT AND TRADEMARK OFFICE
CERTIFICATE OF CORRECTION

PATENT NO. : 7,660,882 B2 Page 1 of 1
APPLICATION NO. : 10/866067
DATED : February 9, 2010
INVENTOR(S) : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1609 days.

Signed and Sealed this

Fourth Day of January, 2011

David J. Kappos
*Director of the United States Patent and Trademark Office*